United States Patent [19]
Raleigh

[11] Patent Number: 5,654,389
[45] Date of Patent: Aug. 5, 1997

[54] ALKYLPOLYSILOXANES

[75] Inventor: William J. Raleigh, Rensselaer, N.Y.

[73] Assignee: General Electric Company, Waterford, N.Y.

[21] Appl. No.: 631,646

[22] Filed: Apr. 8, 1996

Related U.S. Application Data

[63] Continuation of Ser. No. 426,447, Apr. 21, 1995, abandoned, which is a continuation of Ser. No. 245,989, May 18, 1994, abandoned.

[51] Int. Cl.$^6$ .................................................. C08G 77/08
[52] U.S. Cl. ............................ 528/15; 528/25; 525/479
[58] Field of Search .......................... 528/15, 25; 525/479

[56] References Cited

U.S. PATENT DOCUMENTS

| | | |
|---|---|---|
| 2,823,218 | 2/1958 | Speier et al. . |
| 2,970,150 | 1/1961 | Bailey . |
| 3,159,601 | 12/1964 | Ashby . |
| 3,159,662 | 12/1964 | Ashby . |
| 3,220,972 | 11/1965 | Lamoreaux . |
| 3,418,353 | 12/1968 | Brown . |
| 3,445,420 | 5/1969 | Kookootsedes et al. ............. 528/15 |
| 3,631,220 | 12/1971 | Wojdac ............................... 528/15 |
| 4,172,101 | 10/1979 | Getson ................................ 528/15 |
| 4,340,710 | 7/1982 | Brown, Jr. ........................... 528/15 |
| 4,465,818 | 8/1984 | Shirahata et al. ................... 528/15 |
| 4,526,953 | 7/1985 | Dallavia, Jr. ........................ 528/15 |
| 5,334,688 | 8/1994 | Loo ..................................... 528/15 |

FOREIGN PATENT DOCUMENTS

| | | |
|---|---|---|
| 0 202 542 | 11/1986 | European Pat. Off. . |
| 0 258 900 | 3/1988 | European Pat. Off. . |

OTHER PUBLICATIONS

Chemical Abstract 95:344455 & Yingyong Huaxue, 12(2), 113–4, (1995) Hydrosilation of hydrogensiloxanes with divinyltetramethyldisiloxane.

*Primary Examiner*—Melvyn I. Marquis
*Attorney, Agent, or Firm*—Kenneth S. Wheelock

[57] ABSTRACT

The present invention relates to a method for high viscosity bridged alkylpolysiloxane utilizing tetramethyldivinylsiloxane.

3 Claims, No Drawings

ALKYLPOLYSILOXANES

This is a continuation of Ser. No. 08/426,447 filed on Apr. 21, 1995, now abandoned, which is a continuation of Ser. No. 08/245,989 filed May 18, 1994, also now abandoned.

The present invention relates to a method to make alkylpolysiloxane. More particularly, the present invention relates to a unique method to produce high viscosity bridged alkylpolysiloxanes utilizing tetramethyldivinylsiloxane.

BACKGROUND OF THE INVENTION

Alkylpolysiloxanes are well known in the art due to their ability to lubricate unusual surfaces such as aluminum. The most probable reason for their ability to lubricate unusual surfaces and the probable mechanism of wear prevention involves the bulkiness of the molecule and the opportunity for intermolecular entanglement which forms thick, non-adherent films. These products have been used in hair care applications for improved gloss and film forming features versus lower molecular weight analogs. Other uses include lubricants, for example, metal, plastic, glass or rubber materials, and in textiles as fiber lubricants or in fabric finishing.

It has been know that alkylpolysiloxane fluids can be prepared by the reaction of one or more olefinic hydrocarbons, e.g., α-olefins with SiH-containing organopolysiloxanes. For example, U.S. Pat. No. 3,418,353 issued to Brown, Jr. discloses a method of making alkylpolysiloxanes by reacting the organopolysiloxane starting materials with the olefinic hydrocarbons in the presence of conventional SiH-olefin addition catalyst.

The viscosities of the resulting products of the conventional process range from 50 to 1000 cstks. Since the process merely adds alkyl chains derived from the olefinic hydrocarbons to SiH-containing organopolysiloxane, the viscosities of the starting materials are not substantially increased. Attempts have been made to make high molecular weight methyl hydrogen fluids by reducing the chainstopper, trimethyl siloxy, of methyl hydrogen siloxane. However, the reaction mixture gels during hydrosilation with the olefin.

SUMMARY OF THE INVENTION

The present invention provides a hydrosilation reaction which makes these desirable high viscosity alkyl siloxanes. The process comprises mixing SiH-containing organopolysiloxane, olefinic hydrocarbon, vinyl-containing siloxane and a hydrosilation catalyst, and heating the mixture. The high molecular weight bridged alkylpolysiloxane from this process are not previously known.

DETAILED DESCRIPTION OF THE INVENTION

The present invention provides an efficient method to produce high viscosity alkyl siloxanes. The starting materials employed in the invention is SiH-containing organopolysiloxane, olefinic hydrocarbon, vinyl-containing siloxane such as tetramethyldivinyldisiloxane (hereinafter "TMDVS") and a hydrosilation catalyst.

Generally speaking, the SiH-containing organopolysiloxane starting materials employed in preparing the products of the present invention are organohydrogen polysiloxanes having the formula:

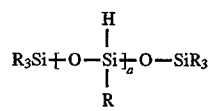
(1)

where R is a member selected from the class consisting of methyl and phenyl; a has an average value of from 4 to 40. In accordance with the preferred embodiment of the present invention, in which R is methyl, the starting materials employed in the practice of the present invention can be described as liquid trimethylsilyl chain-stopped methyl hydrogen polysiloxanes containing an average of from 4 to 10 methyl hydrogen siloxane units per molecule. These organohydrogen polysiloxanes are well known in the art.

The olefinic hydrocarbon employed in the practice of the present invention is α-olefin having the formula:

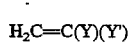
(1)

where Y is a member selected from the class consisting of hydrogen and monovalent hydrocarbon radicals free of aliphatic unsaturation and Y' is hydrogen or an aryl radical. Among the monovalent hydrocarbon radicals represented by Y are alkyl radicals, such as methyl, ethyl, propyl, isopropyl, decyl, dodecyl and the like, radicals containing up to 24 carbon atoms; aryl radicals, such as phenyl, tolyl, xylyl, naphthyl, etc. radicals; and aralkyl radicals, such as benzyl, phenylethyl, etc. radicals. Preferably, the radical represented by Y is an alkyl radical containing no more than 22 carbon atoms. The aryl radicals represented by Y' include all of the conventional aryl radicals previously mentioned in connection with the definition of Y, with the preferred aryl radical being phenyl. Illustrative of some of the specific alpha-olefins within the scope of the above formula are, for example, ethylene, propylene, butene-1, pentene-1,3-methylbutent-1, hexene-1,3-methylpentene-1,4-methylpentent-1, octene-1, decylene-1, dodecylene-1, tetradecylene, hexadecylene-1, octadecylene, styrene, alpha-methylstyrene, etc.

The vinyl-containing siloxane employed in the practice of the present invention is tetramethyldivinyldisiloxane (hereinafter "TMDVS") having the following structure.

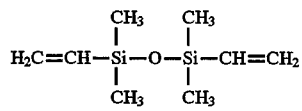

A sufficient amount of TMDVS will be added to the reaction vessel. The mixture is agitated and heated to 50°–125° C. The exothermic heat of reaction raises to about 125° C. Heating is maintained at 125° C., for long enough to complete the reaction, usually about two hours after all the components are mixed together. Then the mixture is cooled and filtered.

The reaction is carried out in the presence of a conventional SiH-olefin addition catalyst. These catalysts are generally well known in the art, and useful materials are the elemental platinum catalysts, such as are described in U.S. Pat. No. 2,970,150 issued to Bailey or the chloroplatinic acid catalyst described in U.S. Pat. No. 2,823,218 issued to Speier et al. Further types of catalysts useful in the addition reactions are the materials which can be described as "platinum alcoholates" of U.S. Pat. No. 3,220,972 issued to Lamoreaux. Still further types of catalysts types of catalysts are the platinum cyclopropane complex which is described and claimed in U.S. Pat. No. 3,159,662 issued to Ashby and the platinum ethylene complex described and claimed in U.S. Pat. No. 3,159,601 issued to Ashby.

The amount of catalyst employed in effecting reaction between the olefin and the methyl hydrogen siloxane can vary within wide limits. The only requirement is that a sufficient amount of the catalyst is present to effect catalysis with any of the elemental catalysts or the platinum compound catalysts described above. When platinum is employed as a catalyst, ordinary 5 parts platinum metal per 1 million parts of siloxane will be effective to promote the hydrosilation reaction.

Considering the case in which the composition prepared by the process of the present invention and within the scope of the present invention is to be a homopolymer, i.e., where only a single alpha-olefin is to be reacted with the organohydrogen polysiloxane, the reaction is generally effected by fairly conventional means by first charging the methyl hydrogen siloxane and the platinum to a reaction vessel. A portion of the α-olefin is then added, generally about 50% to 90% of the total amount of α-olefin to be employed in the entire reaction. The temperature of the reaction mixture is gradually increased until the rate of temperature rise becomes greater than that supplied by the heating element. Subsequently, the desired amount of the TMDVS is added and the reaction temperature is maintained by controlling the rate of addition of the TMDVS. The remaining olefin is added dropwise to the reaction mixture until the reaction is completed, as indicated by Infra Red. The temperature of the reaction vessel is maintained at the temperature in the neighborhood of 120° C. to 140° C. for two hours.

The final product from the process is high molecular weight bridged alkylpolysiloxane having the following structure.

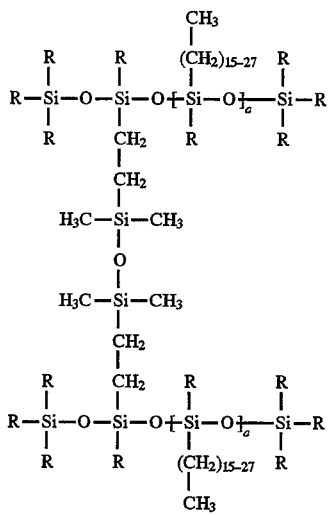

where R and a are as previously defined.

DESCRIPTION OF THE PREFERRED EMBODIMENTS

The following examples describe compositions prepared according to this invention. They are illustrative only and are not to be construed to limit the invention in any manner whatsoever.

All reactions were ran in 2 liter glass 3-neck flask fitted with stirrer, condenser and thermometer. All reactions were run "neat"; i.e., no solvent diluent. The products were not stripped of potential lower molecular weight species. All viscosities were measured at 25° C. Unless otherwise indicated, all parts are by weight.

EXAMPLE 1

To a reaction vessel was charged 203 grams of methyl hydrogen siloxane. To the reaction vessel was also charged 5 grams of TMDVS and 0.1 gram of the platinum. The mixture was heated to 70° C. 772 grams of $C_{16}$–$C_{18}$ α-olefin was added at a rate sufficient to maintain the reaction temperature in the neighborhood of from 120° C. to 130° C. The reaction vessel was maintained at the temperature of 120° C. for two hours to insure complete reaction of the olefin with methyl hydrogen siloxane. Infra Red confirmed that more than 97% of the available silicon-bonded hydrogen atoms reacted with the olefin. The resulting product is 1856 cstks.

COMPARATIVE EXAMPLE 1

To a reaction vessel was charged 203 grams of methyl hydrogen siloxane. To the reaction vessel was also charged 0.1 gram of the platinum. 797 grams of $C_{16}$–$C_{18}$ α-olefin was added over 90 minutes. The temperature of the mixture increased from 25° C. to 86° C. The reaction mixture was then heated to a temperature of 125° C. and the reaction vessel was maintained at the temperature for two hours to insure complete reaction of the olefin with methyl hydrogen siloxane. Infra Red confirmed that more than 97% of the available silicon-bonded hydrogen atoms reacted with the olefin. The viscosity of the resulting product is 1109 cstks.

EXAMPLE 2

To a reaction vessel was charged 203 grams of methyl hydrogen siloxane. To the reaction vessel was also charged 0.1 gram of the platinum. The mixture was heated to 50° C. 15 grams of TMDVS was added. No exotherm was noted. 772 grams of $C_{16}$–$C_{18}$ α-olefin was added. No exotherm was noted when 25% of the olefin was added. Then vigorous exotherm occurred and the temperature increased to 140° C. Product gelled in pot.

EXAMPLE 3

To a reaction vessel was charged 203 grams of methyl hydrogen siloxane. To the reaction vessel was also charged 0.1 gram of the platinum. $C_{16}$–$C_{18}$ α-olefin was added at a rate sufficient to maintain the reaction temperature at 90° C. After 386 grams of the olefin was added, 15 grams of TMDVS was added over 15 minutes. Exotherm was noted. After TMDVS was added, 386 grams of the olefin was added. The mixture was maintained at the temperature of 120° C. for two hours to insure complete reaction of the olefin with methyl hydrogen siloxane. Infra Red confirmed that more than 98% of the available silicon-bonded hydrogen atoms reacted with the olefin. The resulting product is 4904 cstks.

EXAMPLE 4

To a reaction vessel was charged 203 grams of methyl hydrogen siloxane. To the reaction vessel was also charged 0.1 gram of the platinum. 386 grams of the $C_{16}$–$C_{18}$ α-olefin was added. The temperature increased to 100° C. 20 grams of TMDVS was added over 15 minutes. Exotherm was maintained. Another 386 grams of the olefin was added. The mixture was maintained at the temperature of 120° C. for two hours to insure complete reaction of the olefin with methyl hydrogen siloxane. Infra Red confirmed that more than 98% of the available silicon-bonded hydrogen atoms reacted with the olefin. The resulting product is 23,448 cstks.

TABLE

| % TMDVS | Viscosity (cstks) |
|---|---|
| None | 1109 |
| .5 | 1856 |
| 1.5 | 4904 |
| 2.0 | 23,448 |

The data in examples 1 through 5 show that product viscosity, related to molecular weight, increases as amount of TMDVS is increased. Of significant importance is that the TMDVS must be added to partially reacted hydride fluid or uncontrolled crosslinking may occur as example 2. 50% of olefin was added prior to crosslinking with TMDVS followed by reaction completion with remainder of olefin. Conditions may vary with different olefin materials. Aromatic olefins such as a methyl styrene or styrene derivatives may also be utilized.

Many variations of the invention will suggest themselves to those skilled in this art in light of the above, detailed description. All such obvious modifications are within the full intended scope of the appended claims.

We claim:

1. Bridged alkylpolysiloxanes, comprising units derived from (a) a Si—H-containing organopolysiloxane having the formula:

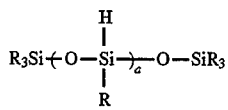

where R is methyl or phenyl and a has an average value of from 4 to 40;

(b) an olefinic hydrocarbon having the formula:

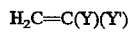

where Y is selected from the group consisting of hydrogen and monovalent hydrocarbon radials free of aliphatic unsaturation and Y' is hydrogen or an aryl radical; and (c) tetramethyldivinyldisiloxane;

wherein said bridged alkylpolysiloxanes are bridged by units derived from tetramethyldivinyldisiloxane.

2. The alkylpolysiloxane of claim 1, wherein R is methyl.

3. The alkylpolysiloxane of claim 1, wherein R is phenyl.

* * * * *